(12) United States Patent
Okigami

(10) Patent No.: US 6,401,116 B1
(45) Date of Patent: Jun. 4, 2002

(54) DEVICE SELECTING TROUBLE-INFORMATION-PROVIDING MANAGEMENT SERVER AND REMOTE TROUBLE MANAGEMENT SYSTEM INCLUDING THE DEVICE

(75) Inventor: Masafumi Okigami, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/236,391

(22) Filed: Jan. 25, 1999

(30) Foreign Application Priority Data

Feb. 10, 1998 (JP) .......................................... 10-027691

(51) Int. Cl.[7] .......................................... G06F 15/173
(52) U.S. Cl. ............................ 709/223; 709/224; 714/4
(58) Field of Search ................................ 709/223, 224, 709/225, 250, 229; 714/4, 25

(56) References Cited

U.S. PATENT DOCUMENTS

| | | | | |
|---|---|---|---|---|
| 5,742,762 A | * | 4/1998 | Scholl et al. ................ 709/203 |
| 5,812,769 A | * | 9/1998 | Graber et al. .......... 709/200.12 |
| 5,958,012 A | * | 9/1999 | Battat et al. ................ 709/224 |
| 5,958,016 A | * | 9/1999 | Chang et al. ................ 709/229 |
| 5,961,594 A | * | 10/1999 | Bouvier et al. ............. 709/223 |
| 5,974,562 A | * | 10/1999 | Townsend et al. ............. 714/4 |
| 5,996,086 A | * | 11/1999 | Delaney et al. ................ 714/4 |
| 6,138,249 A | * | 10/2000 | Nolet .......................... 714/25 |

FOREIGN PATENT DOCUMENTS

JP 7-297826 11/1995

* cited by examiner

*Primary Examiner*—Zarni Maung

(57) ABSTRACT

A remote trouble management system of the present invention is furnished with a plurality of devices connected to an intranet; and a plurality of management servers for managing the plurality of devices individually through the intranet or an internet connected the intranet, wherein each of the plurality of devices includes a trouble information notifying device for, when a trouble occurs therein, notifying the trouble to the plurality of management servers by sending trouble information through a request/response type protocol, in which a request receiver returns a response, upon receipt of a request, to a request sender. Accordingly, the information of the trouble occurring in the device can be sent to the management server in a reliable manner. On the other hand, information corresponding to the trouble information can be returned from the management server having received the trouble information in a reliable manner. Consequently, a trouble occurring in the device can be removed immediately and correctly.

15 Claims, 10 Drawing Sheets

FIG. 4

| NOTIFY PARTY | URL |
|---|---|
| OPERATOR | www.admin.company.co.jp |
| NETWORK ADMINISTRATOR | www.admin.company.co.jp |
| TROUBLE MANAGEMENT COMPANY | www.manage.co.jp |
| PARTS SERVICE COMPANY | www.partsservice.co.jp |
| ↓ | ↓ |

| NOTIFY PARTY GROUP | NOTIFY PARTIES' LIST |
|---|---|
| GROUP 1 | OPERATOR |
| GROUP 2 | TROUBLE MANAGEMENT COMPANY PARTS SERVICE COMPANY |
| GROUP 3 | TROUBLE MANAGEMENT COMPANY |
| ↓ | ↓ |

| TROUBLE ITEM | TROUBLE CODE | NOTIFY PARTY GROUP |
|---|---|---|
| NO PAPER | 001 | GROUP 1 |
| NO TONER | 002 | GROUP 2 |
| HARD ERROR2 | 003 | GROUP 3 |
| ↓ | ↓ | ↓ |

```
START
  │
  ▼
GENERATE STATUS LINE SECTION      ~S51
  │
  ▼
GENERATE HTTP HEADER SECTION      ~S52
  │
  ▼
GENERATE SUPPORT INFORMATION SECTION   ~S53
  │
  ▼
RETURN
```

FIG. 13

| COMPANY NAME | ABC Corporation |
|---|---|
| PERSON IN CHARGE | TARO YAMADA |
| TELEPHONE NUMBER | 03-1111-XXXX |
| PLACE OF INSTALLATION | MINATO-KU, TOKYO |
| DEVICE MODEL | ABC printer001 |
| MANAGEMENT ID NUMBER | 100.100.100.100 |
| PROXY ADDRESS | 1.2.3.4 |
| TROUBLE MANAGEMENT SERVER | www.manage.co.jp |

DEVICE SELECTING TROUBLE-INFORMATION-PROVIDING MANAGEMENT SERVER AND REMOTE TROUBLE MANAGEMENT SYSTEM INCLUDING THE DEVICE

FIELD OF THE INVENTION

The present invention relates to a system for managing a trouble occurring in a device connected to a network, and more particularly, to a remote trouble management system for managing a trouble occurring in a device from a distance.

BACKGROUND OF THE INVENTION

To perform maintenance of a plurality of intracompany devices, including a copying machine, a printer, a facsimile machine, a multi-function device furnished with a plurality of functions, such as copying, printing and facsimile functions, companies have been adopting a method for managing these devices collectively at one location by interconnecting these devices through a network.

In an example method for managing devices interconnected through the network, a trouble occurring in each device is managed by an outside trouble management company through a modem and a telephone line, for example.

To be more specific, each device is furnished with a function for enabling the outside trouble management company to check the operating condition through the modem connected to the telephone line, and the outside company checks the operating condition of each device periodically through the telephone line using the above function to find if there is any trouble in each device.

However, the above method using the modem and telephone line has the following problems:

① A communication fee is borne because this method uses the telephone line.

② The devices are checked at the trouble management company's convenience, that is, in accordance with the management schedule. Therefore, it is very difficult to obtain trouble information from the device upon occurrence of the trouble.

③ The trouble management company receives the trouble information in the first place, and forwards the same to those who should know it. Thus, there is a time lag since the trouble occurred until the trouble information is forwarded to the last person. Moreover, this process is tedious and demands much time and labor.

④ When notified of the trouble occurring in any of the devices interconnected through the network inside the company by the outside trouble management company, an intracompany network administrator or a user of the device in trouble must find a troubleshooting method or to whom he should claim for the damages in the manual, or place a purchase order in case that consumable goods are used up.

To eliminate these troubles, Japanese Laid-open Patent Application No. 297826/1995 (Tokukaihei No. 7-297826), published on Nov. 10, 1995, discloses a trouble management method for notifying the occurrence of a trouble in any of the devices interconnected through the network to the intracompany network administrator and outside trouble management company by sending the trouble information through e-mails.

According to the trouble management method disclosed in the above publication, the e-mail is used as the means for notifying a trouble occurring in any of the devices. Therefore, it has become possible to send the trouble information simultaneously to those who should know it, such as the intracompany network administrator, the outside trouble management company, and an outside parts service company, in a very simple manner.

In addition, although the e-mails are sent through the telephone line, only a communication fee to the nearest mail server is charged in general. Hence, the above method can save the communication fee compared with the method of checking the operating condition of each device through the telephone line.

However, the management method using the e-mails has a unique problem arising from the use of the e-mails. Also, the above management method has another problem that it can not serve as stable trouble information sending means.

To be more specific, when the trouble information is sent through the e-mails, there may be a time lag until the trouble information is received by the intracompany network administrator and outside trouble management company. Therefore, even if the currently occurring trouble has to be handled urgently, the intracompany network administrator and outside trouble management company may not be able to take an immediate troubleshooting action.

Also, the e-mails may be lost somewhere in the communication passage, and will not be received by the intracompany network administrator and outside trouble management company.

Further, in the management method using the e-mails, the e-mail receiver will not know the trouble information until he reads the e-mail. Thus, a trouble can be notified simultaneously to those who should know it, such as the intracompany network administrator and the outside trouble management company, but there may be a time lag since the trouble has occurred until the e-mail receivers read the e-mails. Therefore, even if the currently occurring trouble has to be handled urgently, the intracompany network administrator and outside trouble management company may not be able to take an immediate troubleshooting action.

SUMMARY OF THE INVENTION

It is therefore an object of the present invention to provide a remote trouble management system which can notify a trouble occurring in any of the intracompany devices interconnected through the network to the intracompany network administrator, outside trouble management company, etc. from a distance in real time, so that an immediate and correct troubleshooting action can be taken.

To fulfill the above and other objects, a remote trouble management system of the present invention is furnished with:

a plurality of devices connected to an intranet; and
a plurality of management servers for managing the plurality of devices individually through the intranet or an internet connected to the intranet,
wherein each of the plurality of devices includes a trouble information notifying unit for, when a trouble occurs therein, notifying the trouble to the plurality of management servers by sending trouble information through a request/response type protocol, in which a request receiver returns a response, upon receipt of a request, to a request sender.

In the above remote trouble management system, the trouble information notifying unit provided in the device notifies the trouble occurring therein to the management server through the request/response type protocol, in which a request receiver returns a response, upon receipt of a request, to a request sender. Thus, the information of the trouble occurring in the device can be sent to the management server in a reliable manner, and information responding to the trouble information can be returned from the management server which has received the trouble information.

It is preferable that the protocol has a function to pass through the security system established on the intranet or internet or on both.

Accordingly, a trouble occurring in any of the devices interconnected through the network can be notified not only to the intracompany network administrator, but also to the outside trouble management servers by allowing the trouble information to pass through the security system established inside and/or outside of the company.

Further, it is preferable that the protocol is an HTTP (Hyper Text Transfer Protocol).

For a fuller understanding of the nature and advantages of the invention, reference should be made to the ensuing detailed description taken in conjunction with the accompanying drawings.

BRIEF DESCRIPTION OF THE DRAWINGS

FIG. 4 is a table showing a correspondence between a notify party to whom information of a trouble occurring in the device should be notified, and a URL for each notify party;

FIG. 5 is a table showing a correspondence between a notify party group to which information of a trouble occurring in the device should be notified, and a notify parties' list for each notify party group;

FIG. 6 is a table showing a correspondence among a trouble item contained in the trouble information, and a trouble code and a notify party group for each trouble item;

FIG. 12 is a flowchart detailing a process for generating support information in the data sending/receiving procedure of FIG. 11; and FIG. 13 is a view explaining information pre-registered in the intracompany network connected device in the remote trouble management system of FIG. 1.

DESCRIPTION OF THE EMBODIMENTS

The following description will describe an example embodiment of the present invention.

Figure 1:
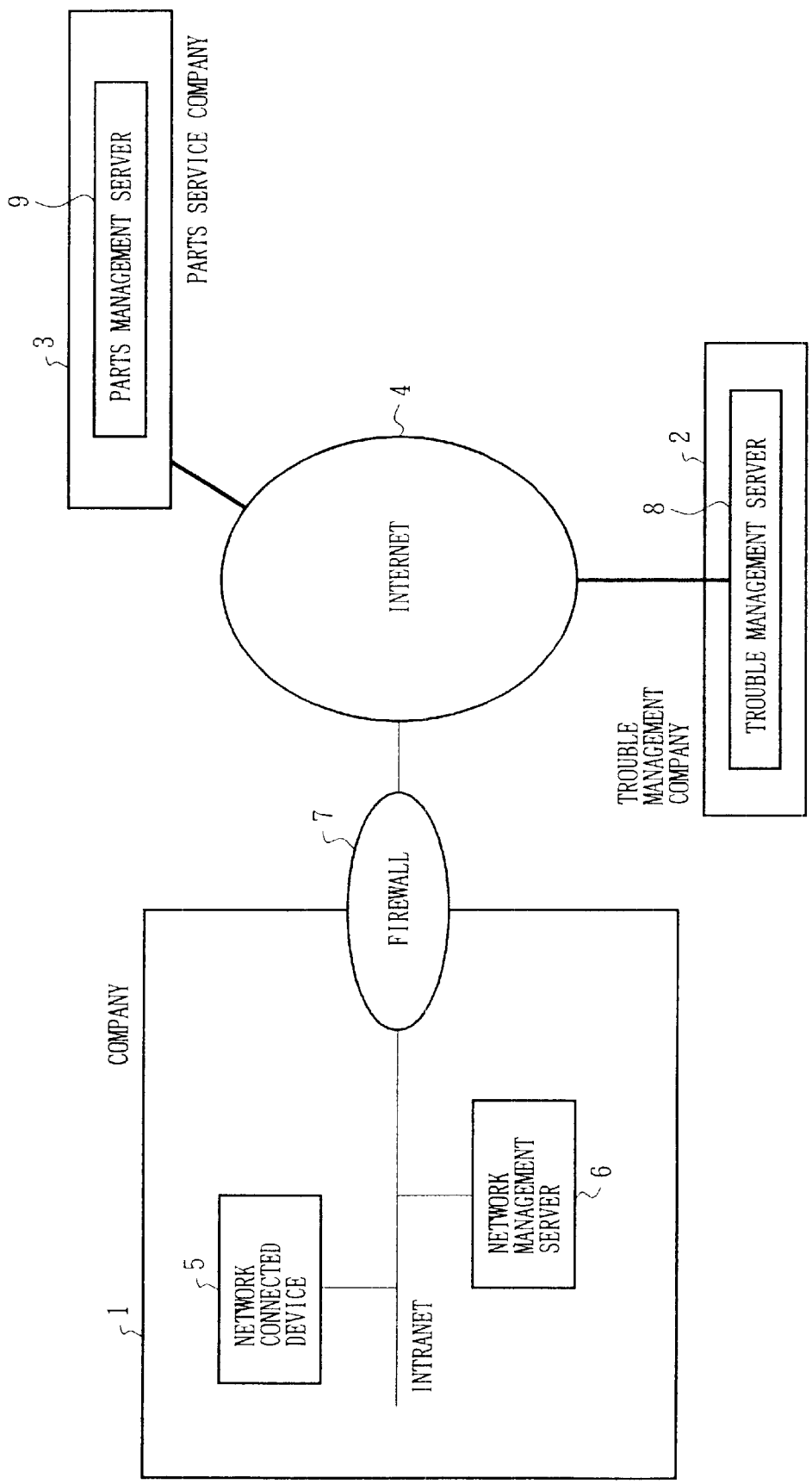
FIG. 1 is a block diagram depicting an arrangement of an entire remote trouble management system of the present invention.

As shown in FIG. 1, a remote trouble management system of the present embodiment is composed of a company 1, a trouble management company 2, and a parts service company 3, which are interconnected through an internet 4.

Installed in the company 1 are: a network connected device 5 connected to an intranet, and a network management server 6 for enabling an intracompany intranet administrator to manage the internal network. Examples of the network connected device 5 include, but not limited to a printer, a copying machine, a facsimile machine, and a multi-function device having more than one function selected from the printing, copying, facsimile functions, etc.

The network connected device 5 and network management server 6 are connected to the internet 4 through a firewall 7 to perform the security management at one specific location in the company 1. The firewall 7 is generally provided on a gateway which establishes a connection across the company 1 and internet 4.

The trouble management company 2 manages the network connected device 5 installed in the company 1 from a distance through the internet 4, and includes a trouble management server 8 for managing information (referred to as trouble information, hereinafter) related to a trouble occurring in the network connected device 5.

The trouble management server 8 receives the trouble information of the network connected device 5 through the internet 4, and returns support information corresponding to the received trouble information to the network connected device 5 and network management server 6 through the internet 4 again.

The parts service company 3 sells, supplies the component parts of the network connected device 5 installed in the company 1, and repairs the network connected device 5. The parts service company 3 includes a parts management server 9 for managing parts information related to the sale and supply of the component parts, and repair of the network connected device 5. Note that the parts information is contained in the trouble information of the network connected device 5.

In the present embodiment, in case that the network connected device 5 is a printer, the trouble information of the network connected device 5 include information related to papers and toner necessary for the printing operation, a hard error, etc.

The support information is the information corresponding to the trouble information. To be more specific, it is the information indicating how the troubles, such as "no paper", "no toner", and a fault in the device per se (hard error), should be removed. In other words, it is the information indicating how the papers or toner is replenished, an how the hard error is handled, etc.

Here, the network connected device 5 installed in the company 1 will be explained in detail.

Figure 2:
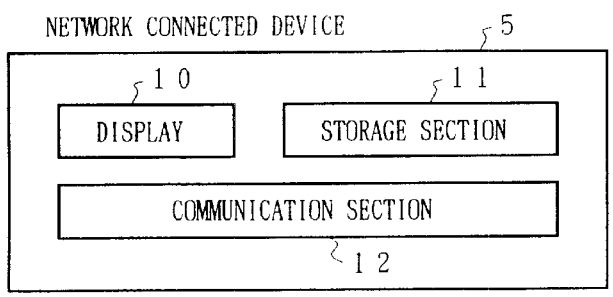
FIG. 2(a) is a block diagram depicting an arrangement of an intracompany network connected device in the remote trouble management system of FIG. 1.
FIG. 2(b) is a block diagram depicting an arrangement of a communication section of FIG. 2(a)
Figure 2:
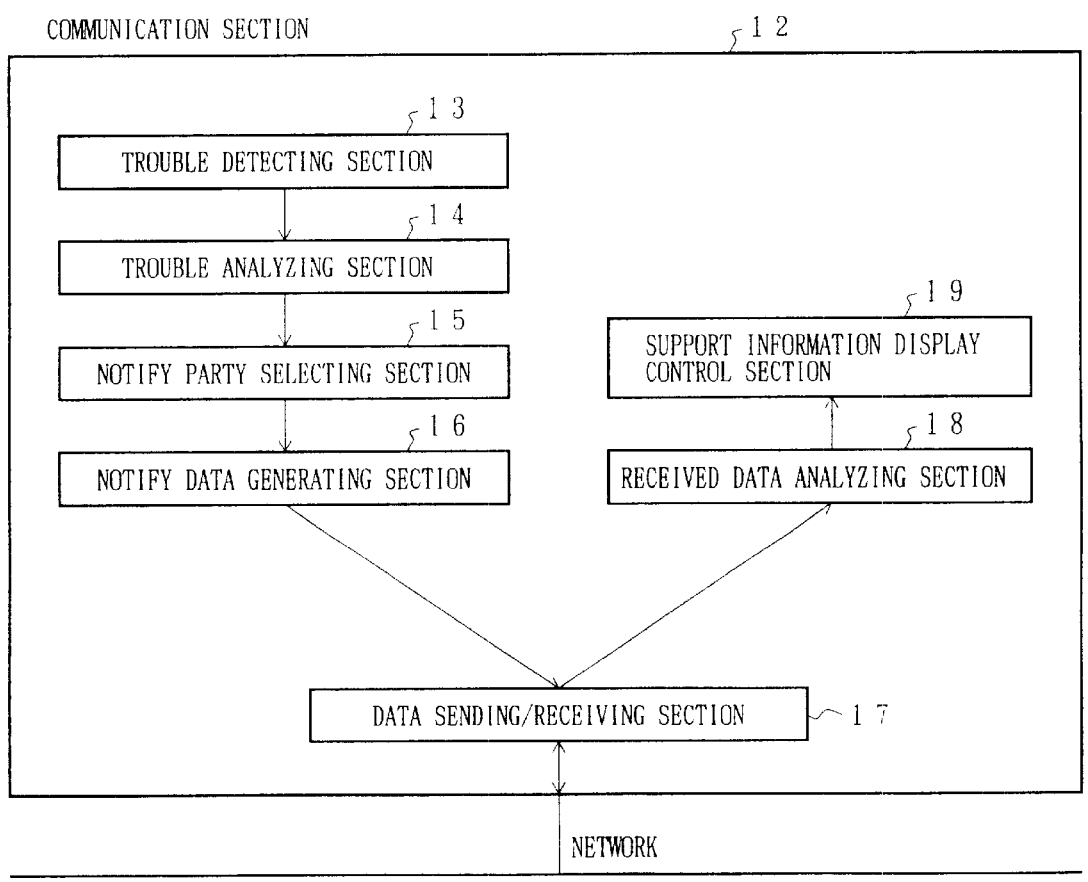

As shown in FIG. 2(a), the network connected device 5 includes a display 10, a storage section 11, and a communication section 12.

The display 10 shows thereon the trouble information of the network connected device 5 temporarily stored in the storage section 11, or the support information sent from the trouble management server 8 installed in the trouble management company 2.

The storage section 11 temporarily stores the trouble information of the network connected device 5, which is detected by a trouble detecting section (trouble information detecting means) 13 and analyzed by a trouble analyzing section 14, both of which will be explained below, and sends the trouble information to the display 10 when necessary.

Also, a notify party group, a notify parties' list, notify parties, URLs (Uniform Resource Locators) of the notify parties are correlated to a trouble item indicating a type of the trouble occurring in the network connected device 5, and pre-registered in the storage section 11.

To be more specific, in case that the network connected device 5 is a printer, three tables are pre-registered in the storage section 11:

a first table 31 of FIG. 4 indicating notify parties, such as an operator, the intracompany network administrator, trouble management company, and parts service company, and URLs for the individual notify parties;

a second table 32 of FIG. 5 indicating notify party groups and notify parties' lists for the individual notify party groups; and a third table 33 of FIG. 6 indicating the trouble items, such as "no paper" "no toner" "hard error", and trouble codes and the notify party groups for the individual trouble items.

The communication section 12 detects a trouble occurring in the network connected device 5, outputs a detection signal, and controls the communication through an HTTP (Hyper Text Transfer Protocol) constructed based on the detection signal, while showing the support information sent from the trouble management server 8 on the display 10.

The HTTP is a request/response type protocol, in which a response from the request receiver's end is returned to the request sender's end. The firewall 7 is furnished with a function for allowing the HTTP to pass through the same.

As shown in FIG. 2(b), for example, the communication section 12 is composed of the trouble detecting section 13, trouble analyzing section 14, a notify party judging section (management server selecting means) 15, a notify data generating section 16, a date sending/receiving section 17, a received data analyzing section 18, and a support information display control section 19.

The trouble detecting section 13 detects a trouble occurring in the network connected device 5, and outputs a detection signal to the trouble analyzing section 14.

The trouble analyzing section 14 distinguishes a type of the trouble occurring in the network connected device 5 based on the detection signal from the trouble detecting section 13, and sends information related to the trouble of the distinguished type to the notify party judging section 15, while storing such information in the storage section 11 temporarily in the form of a trouble code.

The notify party selecting section 15 selects the notify parties in response to the type of the trouble analyzed in the trouble analyzing section 14, and sends the information related to the selected notify parties to the notify data generating section 16. In other words, the notify party selecting section 15 selects the management server (the trouble management server 8 installed in the trouble management company 2 or the parts management server 9 installed in the parts service company 3) in response to the type of the trouble detected by the trouble detecting section 13 and trouble analyzing section 14.

The notify data generating section 16 generates HTTP data by converting the data to an HTTP compatible format data in response to the notify parties selected by the notify party selecting section 15, and registers the trouble code stored in the storage section 11 in an entity body section forming the HTTP data, after which it sends the HTTP data thus generated to the data sending/receiving section 17.

The HTTP data are constituted by four sections: a request line section containing the information designating a POST method; an HTTP header section containing information, such as a date, an MIME version, a Content-type, and a Content-length; a trouble data section containing information, such as "no paper" "no toner"; and a device information section containing information, such as an IP address, a person in charge, and a telephone number. The trouble data section and device information section are registered in the entity body section forming the HTTP data.

The data sending/receiving section 17 sends the HTTP data generated by the notify data generating section 16 to the network management server 6 through the intranet, while sending the same to at least one of the trouble management server 8 installed in the trouble management company 2 and the parts management server 9 installed in the parts service company 3 through the internet 4.

In other words the data sending/receiving section 17 forms trouble information notifying means for, when a trouble occurs in the network connected device 5, notifying the trouble by sending the trouble information to the trouble management company 2 or parts service company 3 using the HTTP data, which are the data for the request/response type protocol for making the trouble management server 8 on the request receiver's end return a response to a request from the network connected device 5 on the request sender's end.

Also, the data sending/receiving section 17 receives the information from the network management server 6, trouble management server 8, or parts management server 9, and sends the received information to the received data analyzing section 18.

The received data analyzing section 18 analyzes the information (data) sent from the data sending/receiving section 17, and extracts the support information from the analysis result, after which it sends the support information to the support information display control section 19.

The support information display control section 19 controls the display on the display 10 in the network connected device 5 in such a manner that the support information sent from the received data analyzing section 18 will be shown thereon.

Next, the trouble management server 8 installed in . the trouble management company 2 will be explained in detail.

As shown in FIG. 3(a), the trouble management server 8 includes a display 20, a storage section 21, and a management data handling section (management data handling means) 22.

The display 20 shows the trouble information of the network connected device 5 based on the HTTP data sent from the communication section 12 in the network connected device 5.

The storage section 21 saves the HTTP data sent from the communication section 12 in the network connected device 5 to manage the trouble information, and outputs the same to the display 20 or management data handling section 22, as the case may be. The HTTP data are saved in the storage section 21 based on a signal sent from a management data storage handling section 27, which will be explained below.

The management data handling section 22 generates the management data for managing the trouble information based on the HTTP data sent from the communication section 12 in the network connected device 5, and based on which it generates the support information to be sent to the network connected device 5 later.

Figure 3:
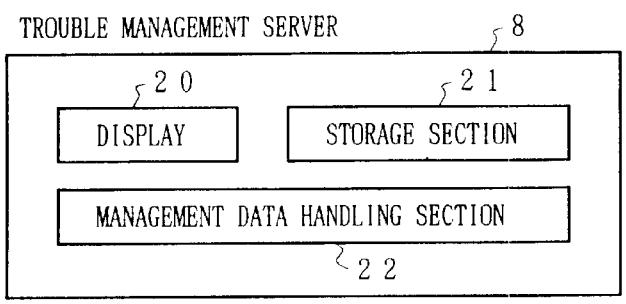
FIG. 3(a) is a block diagram depicting an arrangement of a trouble management server in a trouble management company in the remote trouble management system of FIG. 1.
FIG. 3(b) is a block diagram depicting an arrangement of a management data handling section of FIG. 3(a)
Figure 3:
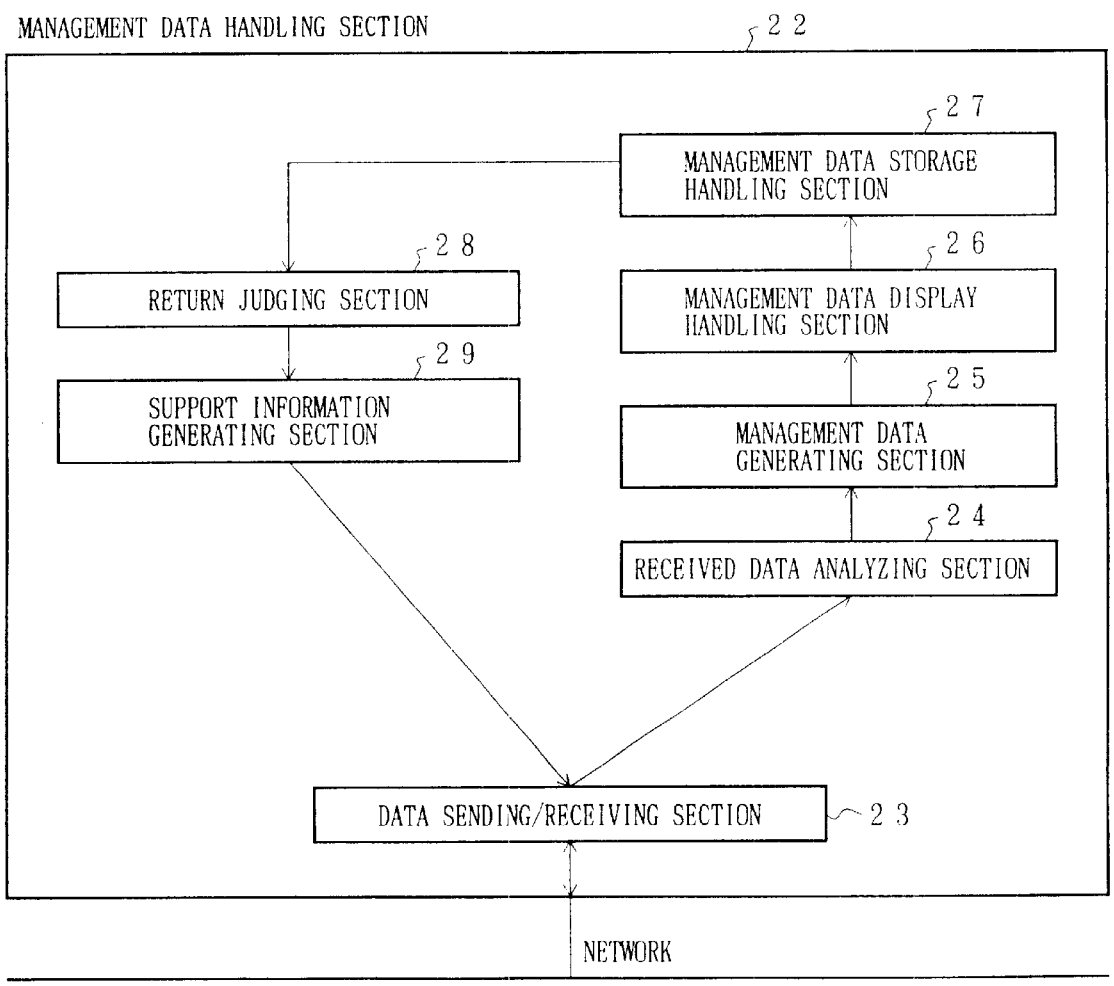

In order to generate the support information corresponding to the trouble information, for example, as shown in FIG. 3(*b*), the management data handling section 22 is composed of a data sending/receiving section 23, a received data analyzing section 24, a management data generating section 25, a management data display handling section 26, the management data storage handling section 27, a return judging section 28, and a support information generating section 29.

The data sending/receiving section 23 receives the HTTP data indicating the trouble information of the network connected device 5 installed in the company 1 through the internet 4, while sending the support information corresponding to the trouble information to the network connected device 5 and network managing server 6 installed in the company 1.

In other words, the data sending/receiving section 23 is composed of receiving means for receiving the HTTP data indicating the trouble information from the network connected device 5, and notifying means for sending the return information to the network connected device 5 in trouble. Note that the return information is the information related to the support for the network connected device 5 and contained in the management data generated in the above manner.

The HTTP data received by the data sending/receiving section 23 are sent to the received data analyzing section 24.

The received data analyzing section 24 analyzes the HTTP data received by the data sending/receiving section 23 to determine which type of trouble is occurring in the network connected device 5, and sends the analysis result to the management data generating section 25.

The management data generating section 25 generates the management data to be managed on the trouble management server 8 based on the analysis result sent from the received data analyzing section 24, and sends the management data to the management data display handling section 26 and management data storage handling section 27.

The management data display handling section 26 makes the display 20 show the management data generated by the management data generating section 25. Here, the management data means the information necessary to manage the network connected device 5, such as troubleshooting information.

On the other hand, the management data storage handling section 27 sends a control signal for saving the HTTP data, namely, the trouble information received by the data sending/receiving section 23, into the storage section 21 based on the management data generated by the management generating section 25. At the same time, the management data storage handling section 27 sends a control signal to the storage section 21, so that the storage section 21 sends the HTTP data saved therein to the return judging section 28.

The return judging section 28 judges whether any response should be returned for the trouble information obtained from the HTTP data based on the HTTP data stored in the storage section 21. The criteria for this response judgement by the return judging section 28 will be detailed below with reference to a flowchart.

When the return judging section 28 has judged that a response should be returned for the trouble information, it sends a judgment signal to the support information generating section 29.

In this case, the support information generating section 29 generates the support information out of the HTTP data, and sends the same to the data sending/receiving section 23, so that the support information will be sent to the network connected device 5.

Thus, since the trouble management company 2 and parts service company 3 are connected to the internet 4 around the clock, they can monitor the network connected device 5 installed in the company 1 constantly.

For example, an exclusive-use application may be started up on the trouble management server 8 installed in the trouble management company 2, so that the trouble information sent from the network connected device 5 installed in the company 1 is shown on the window on the display 20 of the trouble management server 8. Conversely, an HTML (Hyper Text Markup Language) file may be sent to the network connected device 5 installed in the company 1 from the exclusive-use application for the trouble management server 8, so that the information from the trouble management company 2 is shown on the display 10 on the network connected device 5.

Here, the procedure for performing the trouble management in the above-arranged remote trouble management system will be explained in the following.

To begin with, a case where the trouble information of the network connected device 5 is notified, that is, the data sending procedure will be explained with reference to FIGS. 1, 2, and 7 through 9. Assume that an example network connected device 5 is a printer herein.

Firstly, whether there occurs a trouble in the network connected device 5 or not is judged (S1). The trouble detecting section 13 in the network connected device 5 detects a trouble using a trouble-detecting task, such as an error task.

If the trouble detecting section 13 judges there is no trouble in S1, the flow ends.

If the trouble detecting section 13 judges otherwise in S1, the flow proceeds to S2, where the detected trouble is checked in detail to obtain the trouble detail information. Here, the trouble analyzing section 14 in the network connected device 5 analyzes the detected trouble information, whereby the trouble detail information is obtained.

In case that the network connected device 5 is a printer, the trouble detail information includes information indication "no paper", "no toner", a fault in the device (hard error), and so forth, which is handled in the form of the trouble code in the following manner.

Then, whether the trouble currently occurring in the network connected device 5 should be notified to any of the trouble management company 2, parts service company 3, and network management server 6 is judged based on the trouble detail information obtained in the above manner (S3).

When it is judged unnecessary to notify the trouble to any of the aforementioned in S3, the flow ends.

When judged otherwise in S3, the flow proceeds to S4, and notify party group judging process is carried out by the notify party selecting section 15.

Figure 8:
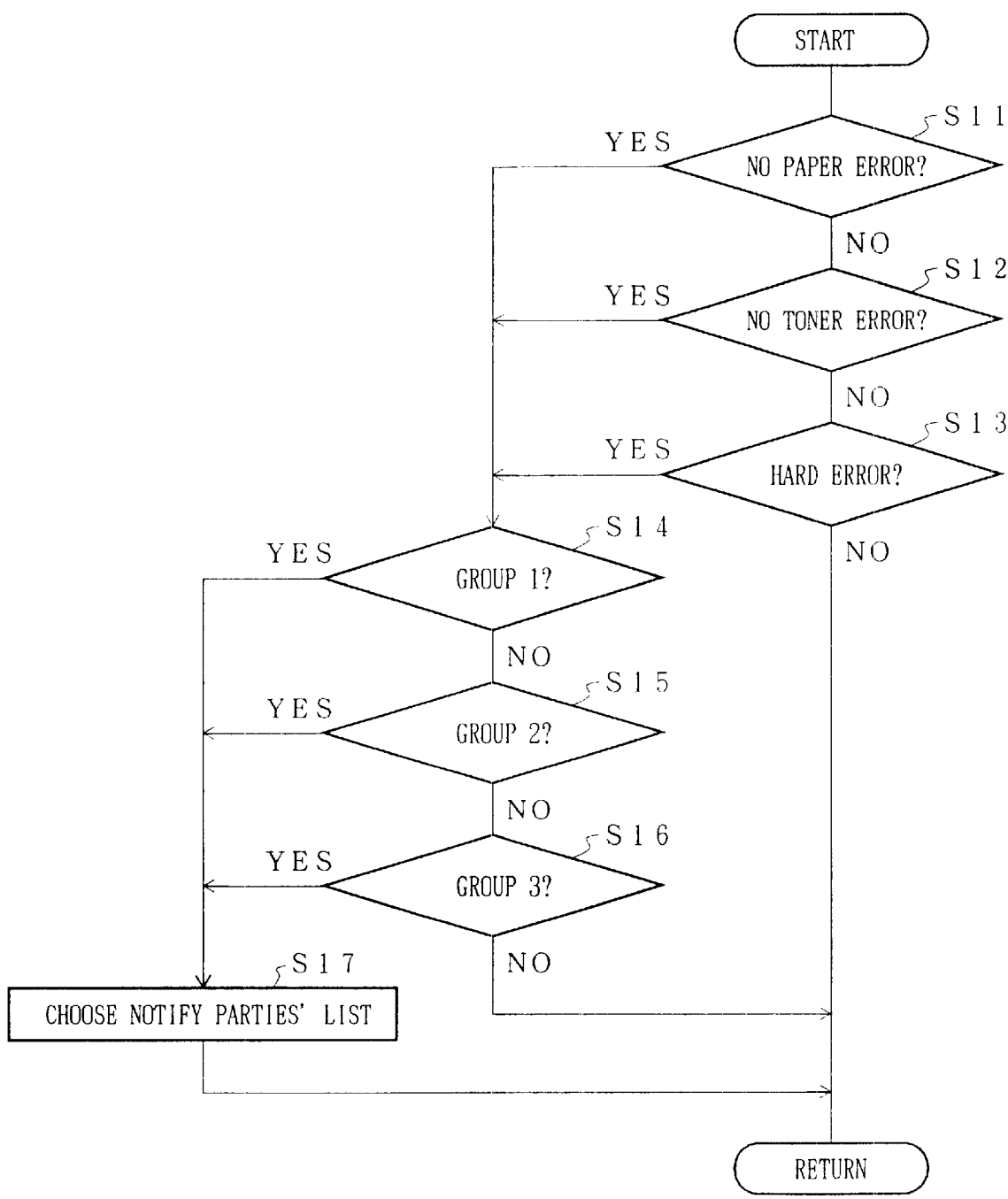
FIG. 8 is a flowchart detailing a process for determining a notify party group in the data sending procedure of FIG. 7.

Here, the notify party group judging process will be explained in the following with reference to the flowchart in FIG. 8.

Firstly, a type of the trouble is judged based on the trouble code in S11 through S13. If the trouble code is judged as none of a paper error indicating "no paper", a toner error indicating "no toner", and a hard error indicting a fault in the device, the notify party group judging process is terminated and the flow proceeds to S5 of FIG. 7.

If the trouble code is judged as being any of the "no paper" error, "no toner" error, and "hard error", the flow proceeds to S14 through S16, where the notify party group, to which the trouble information should be notified, is selected.

Figure 7:
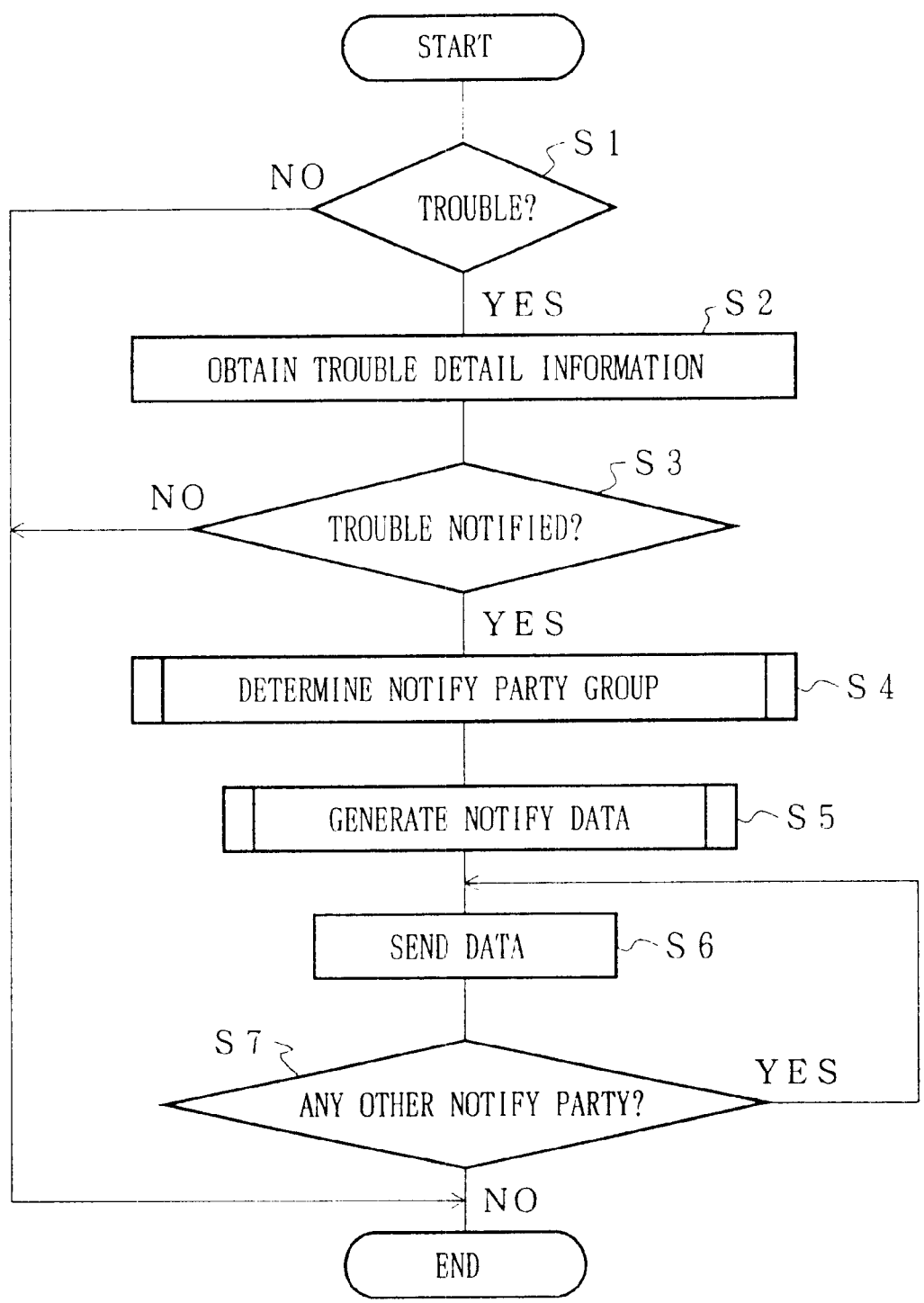
FIG. 7 is a flowchart detailing a data sending procedure on the intracompany network connected device's end in the remote trouble management system of FIG. 1.

If the notify party group is judged as not being any of Groups 1 through 3 pre-registered in the storage section 11, the notify party group judging process is terminated and the flow proceeds to S5 of FIG. 7.

If the notify party group is judged as being any of Groups 1 through 3, a notify parties' list corresponding to the selected group is determined (S17), and the flow proceeds to S5 of FIG. 7.

In S5, the process of generating the notify data to notify the network management server 6, trouble management company 2, parts service company 3 of the trouble information of the network connected device 5 is carried out by the notify data generating section 16.

Figure 9:
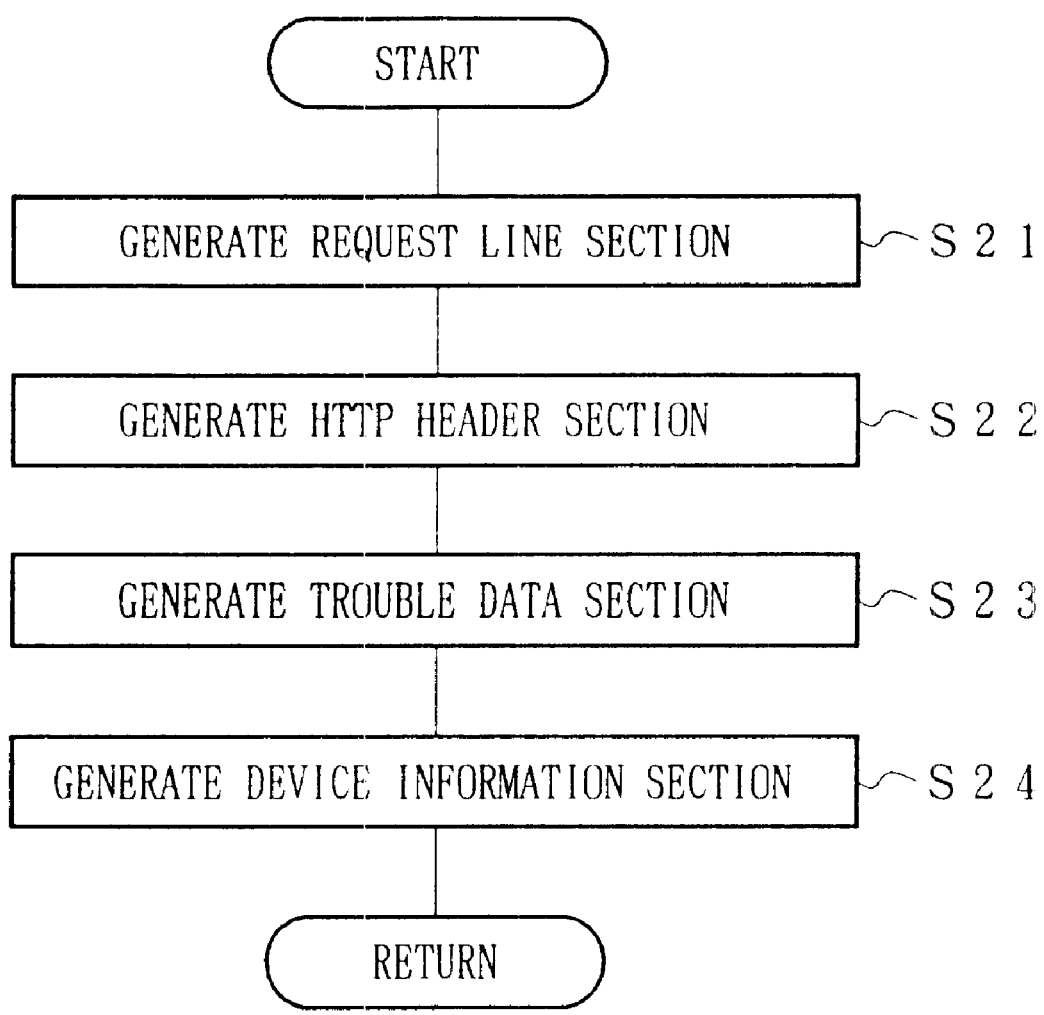
FIG. 9 is a flowchart detailing a process for generating notify data in the data sending procedure of FIG. 7.

Here, the notify data generating process will be explained in the following with reference to the flowchart in FIG. 9. Herein, the notify data are sent to the network management server 6, trouble management company 2, and parts service company 5 in the form of the HTTP data.

Thus, in S5 of FIG. 7, the received data are converted to the HTTP compatible format data, whereby the communication data suitable for the HTTP, that is, the HTTP data, are generated.

Of all the four sections forming the HTTP data, the request line section is generated using the POST method in the first place (S21), and the information designating the POST method is registered therein.

Then, the HTTP header section is generated as an integral part of the HTTP data (S22), and the information including the date, MIME version, Content-type, Content-length, etc. is registered therein.

Next, the trouble data section is generated as an integral part of the HTTP data (S23), and information, such as "no paper" and "no toner", is registered therein.

Finally, the device information section is generated as an integral part of the HTTP data (S24), and the information including the IP address, person in charge, telephone number, etc. is registered therein.

Then, the trouble data section and information device section are registered in the entity body section of the HTTP data thus generated.

After the notify data, that is, the HTTP data, have been generated in S21 through S25 in the above manner, the flow proceeds to S6 of FIG. 7.

In S6, the HTTP data thus generated are sent by the data sending/receiving section 17. More specifically, the data sending/receiving 17 sends the HTTP data thus generated to the URLs of the notifies obtained with reference to the first table 31 of FIG. 4.

Next, whether there is any other notify party or not is judged (S7). When it is judged that there is no other notify party, the process is terminated.

If judged otherwise in S7, the flow returns to S6, so that the data sending/receiving section 17 takes in the URLs of the notify parties successively, and sends the HTTP data to the notify parties as the notify data.

This process is repeated until the data sending/receiving section 17 has sent the HTTP data to the last notify party.

In case that the support information is necessary for the HTTP data sent in the above manner, return data containing the support information are sent to the network connected device 5.

Figure 10:
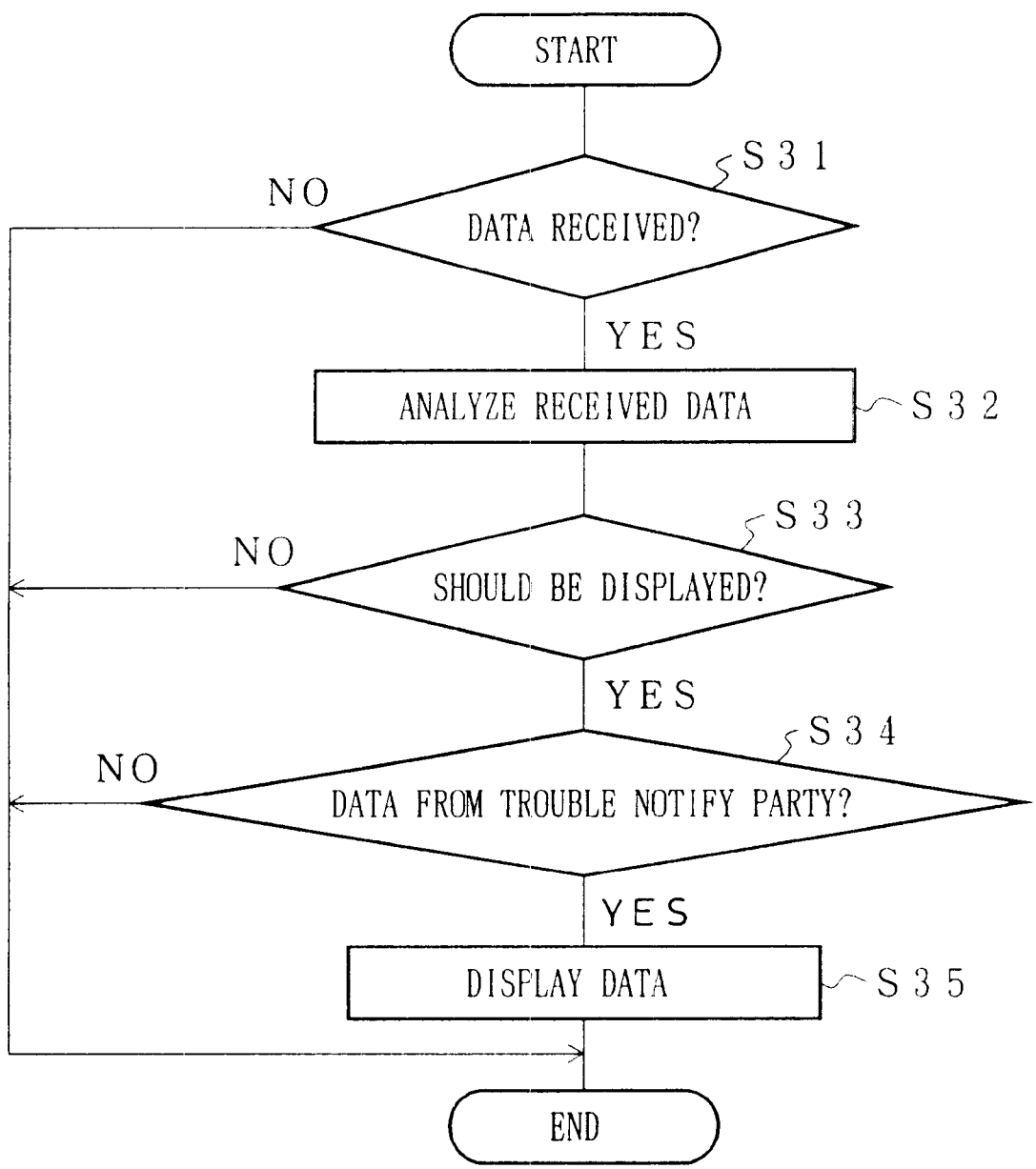
FIG. 10 is a flowchart detailing a data receiving procedure on the intracompany network connected device's end in the remote trouble management system of FIG. 1.

Next, the data receiving procedure of the network connected device 5 when receiving the above return data will be explained in the following with reference to FIG. 10.

Firstly, whether the data have been received or not is checked (S31). Here, whether the return data in response to the notify data of the trouble information of the network connected device 5 have been received by the trouble management company 2 or parts service company 3 or not is checked. If it is judged that the return data have not been received in S31, the data receiving procedure is terminated.

If it is judged otherwise in S31, the flow proceeds to S32, where the received return data (hereinafter, simply referred to as received data) are analyzed by the received data analyzing section 18.

The received data are also in the form of the HTTP data, and constituted by three sections: a status line section containing information including the protocol version and status code; an HTTP header section containing information including date, server, and identification; and a support information section containing information including a contact address and warning data.

The support information is registered in the entity body section forming the HTTP data.

Next, whether the received data bear any information that should be shown on the display 10 or not is checked (S33).

Here, if the received data contain the support information for removing the trouble, such as the address of the parts service company 3 or a person in charge, the received data are judged as should be displayed, and the flow proceeds to S34. If the received data do not contain the support information, they are judged otherwise, and the data receiving procedure is terminated.

In S34, whether the support information is the data from the trouble management server 8 installed in the trouble management company 2 for managing the trouble in the network connected device 5 is checked. Here, it is checked whether or not the support information contained in the received data matches with the content of the management table pre-registered in the storage section 11 in the network connected device 5, like the one shown in FIG. 13.

Here, set forth in the management table shown in FIG. 13 are the management data of the network connected device 5 installed in the company 1.

When the support information is judged as not matching with the management table of FIG. 13, that is, not the data for the notify party of the trouble information, the data receiving procedure is terminated.

When the support information is judged otherwise, that is, as the data for the notify party of the trouble information, the flow proceeds to S35, and the support information is shown on the display 10.

Figure 11:
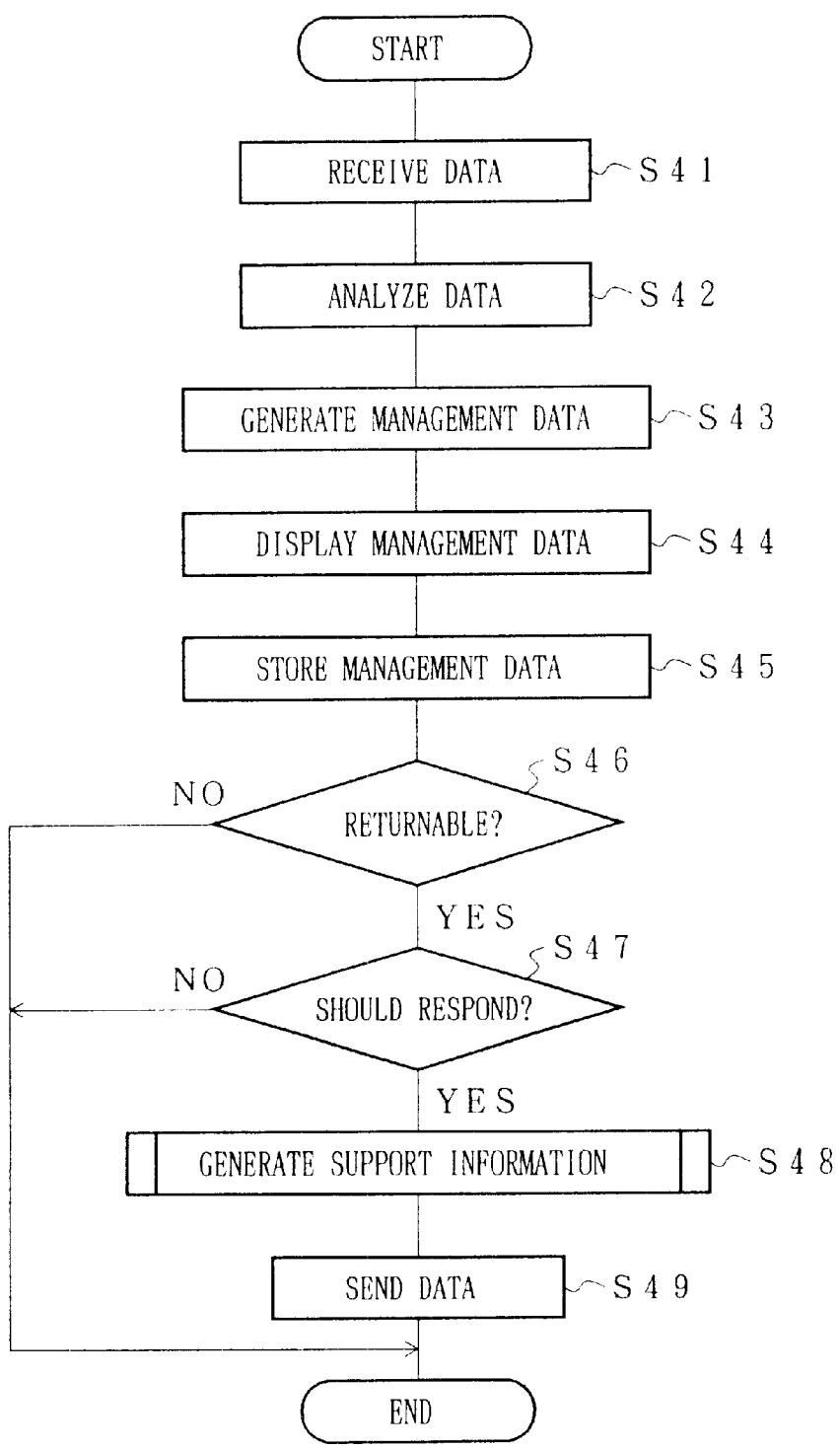
FIG. 11 is a flowchart detailing a data sending/receiving procedure on a trouble management server's end in the trouble management company in the remote trouble management system of FIG. 1.

The trouble management handling has been explained from the standpoint of the network connected device 5. In the following, the procedure on the receiver's end of the notify data related to the trouble information from the network connected device 5, that is, in the trouble management server 8 installed in the management trouble company 2, will be explained with reference to FIGS. 11 and 12.

In the first place, the data sending/receiving section 23 receives the notify data related to the trouble information sent from the network connected device 5 (S41).

Then, the received notify data (hereinafter, referred to as received data) are analyzed by the received data analyzing section 24 (S42).

Next, the management data are generated based on the analysis result from the received data analyzing section 24 by the management data generating section 25 (S43)

Here, the management data generating section 25 extracts items subjected to the management from the information set forth in the management table of FIG. 13 indicating the management data related to the network connected device 5 based on the analysis result from the received data analyzing section 24, and generates the management data with an error code. Then, the management data generating section 25 sends the management data to the management data display handling section 26.

Subsequently, the management data are shown (S44); To be more specific, the management data display handling section 26 converts the management data sent from the management data generating section 25 into the data of a format displayable on the display 20 in the trouble management server 8, whereby the management data are outputted to be shown on the display 20.

On the other hand, the management data generated in S43 are stored in the storage section 21 in the trouble management server 8 by the management data storage handling section 27 (S45).

Next, whether the support information can be returned for the notify data received by the data sending/receiving section 23 is judged (S46).

Here, if the notify data indicating the trouble information of the network connected device 5 is shown on the display 20 in the trouble management server 8, the trouble management server 8 recognizes itself as being the server corresponding to the network connected device 5, and the support information is judged as being returnable, whereupon the flow proceeds to S47. If the trouble management server 8 recognizes itself otherwise, no support information is returned and the procedure is terminated.

Then, whether the support information has to be returned or not for the notify data received by the data sending/receiving section 23 is judged based on the management data generated in S43 (S47). Here, if the trouble contained in the notify data is a type of trouble which the operator of the network connected device 5 can remove, such as "no paper", it is judged unnecessary to return the support information. If the trouble is of a type which the operator can not remove, such as "hard error", it is judged necessary to return the support information for removing the trouble.

In S47, if it is judged unnecessary to return the support information, the procedure is terminated. If judged otherwise, the flow proceeds to S48, where the support information is generated by the support information generating section 29.

The support information is converted to the HTTP data compatible format data, like the trouble information sent form the network connected device 5.

Here, the procedure of generating the support information will be explained in the following with reference to the flowchart in FIG. 12.

In the first place, the status line section is generated as an integral part of the HTTP data (S51), and information, such as the protocol version and status code, is registered therein.

Next, the HTTP header section is generated as an integral part of the HTTP data (S52), and information, such as the date, server, and identification, is registered therein.

Finally, the support information section is generated as an integral part of the HTTP data (S53), and information, such as the contact address and warning data, is registered therein.

The support information is generated by the above procedure.

Then, the support information thus generated is sent through the data sending/receiving section 23 to the network connected device 5 which has sent the notify data (S49).

As has been discussed, according to the present invention, the information of a trouble occurring in any of the devices interconnected through the internal network (intranet) can be sent to the trouble management server through the HTTP. Thus, the trouble information can be sent not only to the intracompany administrator of the network, but also to the outside trouble management company through the security system (firewall 7) established at the gateway across the internal and external of the company.

Consequently, it has become possible to manage the intracompany network connected devices comprehensively by the outside trouble management company.

Also, since a trouble occurring in the network connected device is notified through the HTTP, the trouble is notified upon the occurrence to the intracompany network administrator, outside trouble management company and parts service company, thereby making immediate troubleshooting possible.

Further, since the HTTP used herein is the response/request type protocol, namely a connection type protocol, the data are sent to the correspondent after whether the communication is allowed or not is checked. Therefore, the data can be sent to the correspondent in a reliable manner. In other words, a trouble occurred in the intracompany network connected device can be notified to the outside trouble management company in a secure manner.

In addition, according to the present invention, the trouble can be notified to more than one person (place) inside and/or outside of the company. Thus, for example, the intracompany network administrator, the outside trouble management company and parts service company can share the information related to the trouble at the same time.

Hence, the intracompany network administrator, trouble management company, and parts service company can take an action immediately in good cooperation.

Further, according to the present invention, when a display and an output device are provided to the network connected device, the support information which is sent from the trouble management company and very useful for the troubleshooting, can be outputted. This enables the operator of the network connected device to remove the trouble correctly by himself.

Furthermore, according to the present invention, as has been discussed, when a trouble occurs in the network connected device, the trouble can be notified to a plurality of trouble management servers simultaneously. Under these conditions, the operator of the network connected device can receive the necessary information alone by merely specifying a trouble management server which can return necessary information.

In the present embodiment, a case where the HTTP is used as the request/response type protocol was explained. However, it should be appreciated that the present invention is not limited to this particular case, and any protocol is applicable if it is furnished with the same function as the HTTP, that is, the function for making the request receiver return a response data to the request sender. For example, if a firewall is established between the request sender and request receiver, the adopted protocol must have a function such that makes a request sender send a connection request over the firewall, and a request receiver return a response to the request sender over the firewall.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote trouble management system comprising:

a plurality of devices connected to an intranet; and a plurality of management servers for managing said plurality of devices individually through one of said intranet and an internet connected to said intranet, wherein each of said plurality of devices includes:

trouble information detecting means for detecting a trouble occurring therein;

management server selecting means for selecting one of said plurality of management servers in accordance with a type of the trouble, to which the trouble detected by said trouble information detecting means is notified; and trouble information notifying means for notifying the trouble to the management server selected by said management server selecting means by sending trouble information through a request/response type protocol, in which a request receiver returns a response, upon receipt of a request, to a request sender.

2. The remote trouble management system of claim 1, wherein said request/response protocol is a protocol allowed to pass through a security system established on said intranet and said internet.

3. The remote trouble management system of claim 2, wherein said protocol is an HTTP.

4. The remote trouble management system of claim 1, wherein each of said management servers includes management data handling means for generating management data for managing a device in trouble based on said trouble information sent therefrom.

5. The remote trouble management system of claim 4, wherein said management data handling means includes notify means for sending return information related to a support for the device in trouble, said return information being contained in said management data.

6. The remote trouble management system of claim 1, wherein said management servers comprise a trouble management server for managing information on a trouble occurring in the device.

7. The remote trouble management system of claim 1, wherein said management servers comprise a parts management server for managing information on parts of the devices.

8. A device comprising:

trouble information detecting means for detecting the trouble occurring therein;

management server selecting means for selecting a management server in accordance with a type of the trouble, to which the trouble detected by said trouble information detecting means will be notified; and trouble information notifying means for notifying the trouble to the management server selected by said management server selecting means by sending trouble information through a request/response type protocol, in which a request receiver returns a response, upon receipt of a request, to a request sender.

9. The device of claim 8, wherein said device includes display means for displaying return information from the management server which has sent the trouble information.

10. The device of claim 8, wherein said device includes display means for displaying return information sent from said management server.

11. The device of claim 10, wherein, of all of the return information sent to the device, said display means displays the return information from a pre-registered management server alone.

12. The device of claim 8, wherein the device is a printer.

13. The device of claim 8, wherein the device is a copy machine.

14. The device of claim 8, wherein the device is a facsimile machine.

15. The device of claim 8, wherein the device is a multi-function machine, which has a combination of at least two different functions selected from various functions including printing, copying and facsimile functions.

* * * * *